US010404496B1

(12) United States Patent
Azenkot et al.

(10) Patent No.: US 10,404,496 B1
(45) Date of Patent: Sep. 3, 2019

(54) MITIGATING INTERACTION BETWEEN ADAPTIVE EQUALIZATION AND TIMING RECOVERY IN MULTI-RATE RECEIVER

(71) Applicant: MACOM Technology Solutions Holding, Inc., Lowell, MA (US)

(72) Inventors: Yehuda Azenkot, San Jose, CA (US); Georgios Takos, Mountain View, CA (US); Bart Zeydel, El Dorado Hills, CA (US)

(73) Assignee: MACOM Technology Solutions Holding, Inc., Lowell, MA (US)

( * ) Notice: Subject to any disclaimer, the term of this patent is extended or adjusted under 35 U.S.C. 154(b) by 0 days.

(21) Appl. No.: 16/125,517

(22) Filed: Sep. 7, 2018

(51) Int. Cl.
| | | |
|---|---|---|
| H04B 10/00 | (2013.01) | |
| H04L 25/03 | (2006.01) | |
| H04L 7/00 | (2006.01) | |
| H04B 10/61 | (2013.01) | |

(52) U.S. Cl.
CPC ... H04L 25/03057 (2013.01); H04B 10/6165 (2013.01); H04L 7/0025 (2013.01); H04L 7/0083 (2013.01); *H04L 2025/03681* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,115,433 A * | 9/2000 | de Lantremange | ... | H04L 7/0029 375/232 |
| 7,486,747 B1 * | 2/2009 | Bagley | ....... | H04B 1/7093 375/324 |
| 8,682,180 B1 * | 3/2014 | Nimon | ....... | H04B 10/2569 398/202 |
| 8,897,387 B1 * | 11/2014 | Eliaz | ....... | H04L 25/03178 375/285 |
| 10,135,606 B2 * | 11/2018 | Azenkot | ....... | H04L 25/03885 |
| 2008/0260014 A1 * | 10/2008 | Yang | ....... | H04L 25/03057 375/232 |
| 2010/0046683 A1 * | 2/2010 | Beukema | ....... | H04L 7/0062 375/355 |
| 2012/0121274 A1 * | 5/2012 | Fludger | ....... | H04B 10/61 398/208 |
| 2012/0134407 A1 * | 5/2012 | Bhoja | ....... | H03H 15/00 375/233 |
| 2012/0134684 A1 * | 5/2012 | Koizumi | ....... | H04B 10/613 398/202 |

(Continued)

*Primary Examiner* — Agustin Bello

(57) ABSTRACT

A receiver including an equalizer disposed upstream of a decimator and capable of effectively preventing undesirable interaction between equalization adaptation and the overall timing recovery loop in cases of various data rates. The equalizer operates in a full operation rate even in the case of a lower-than-full data rate, e.g., half or quarter data rate. For input analog signal having 1/M of the full data rate (M>1), M or more Center of Filter (COF) values are determine. Each COF may be derived from a function of a respective set of tap weights and compared with a corresponding nominal COF to obtain a COF offset. The resultant COF offsets are used as indications of clock phase correction caused by equalization adaptation to adjust a set of selected tap weights. The taps selected for adjustment encompass at least M samples to correctly indicate the COF offset associate with one symbol.

22 Claims, 7 Drawing Sheets

(56) References Cited

U.S. PATENT DOCUMENTS

| | | | |
|---|---|---|---|
| 2012/0189319 A1* | 7/2012 | Mo | H04B 10/2569 |
| | | | 398/152 |
| 2014/0211839 A1* | 7/2014 | Mobin | H04L 7/10 |
| | | | 375/233 |
| 2016/0254933 A1* | 9/2016 | Eliaz | H04L 25/03178 |
| | | | 375/296 |
| 2017/0141910 A1* | 5/2017 | Zinser | H04L 5/1461 |
| 2018/0123776 A1* | 5/2018 | Azenkot | H04L 25/03885 |

* cited by examiner

MITIGATING INTERACTION BETWEEN ADAPTIVE EQUALIZATION AND TIMING RECOVERY IN MULTI-RATE RECEIVER

TECHNICAL FIELD

The present disclosure relates generally to the field of signal processing in communications and, more specifically, to the field of timing recovery in signal processing.

BACKGROUND OF THE INVENTION

In communications systems, a transmitter sends data streams to a receiver in symbols, such as bits of data. As the receiver clock is typically not synchronized with the transmitter clock, the receiver needs to correctly recover the clock from the received signal itself. In addition, when data is transmitted over a communication channel, it is usually distorted in terms of phase and amplitude due to various types of noise, such as fading, oscillator drift, frequency and phase offset, and receiver thermal noise. At the receiver, the system is also subject to noise and timing jitter in a time domain. Therefore, the receiver needs a timing recovery process to obtain symbol synchronization, particularly to correct the clock delay and derive the optimal clock phase that is used to sample the received signal and achieve the best Signal-to-Noise Ratio (SNR).

Commonly, in an equalizer-based timing recovery loop of a receiver, an adaptive equalizer is employed to mitigate the effect of intersymbol interference (ISI) caused by the channel distortion. An adaptive equalizer enables the equalization process to be adapted to changes in channel characteristics over time. Typically, the adaptation is performed by dynamically adapting equalization parameters, such as the tap weights of an equalization filter.

Adaptive equalization itself can also result in correction for time delays of the input clock embedded in the received signal, which undesirably interferes with the clock recovery process by the overall timing recovery loop, e.g., to be performed by a phase detector, a loop filter and a VCO in the same timing recovery loop. Particularly, the interference may cause recovered data symbols to shift from their optimized locations. Thus, it is desirable that only the timing recovery loop corrects for delay of the input clock in the received signal.

Conventionally, the problematic interaction between an adaptive equalizer and the associated timing recovery loop is solved by freezing or slowing down the adaptation of the equalizer once acquisition is achieved. More specifically, all the tap weights of the equalization filter are fixed or adapted in small steps to prevent the interaction with the timing recovery loop regarding time delay correction. Unfortunately, freezing or slowing down the equalizer adaptation process inevitably impairs the equalizer's capability of tracking changes in channel characteristics over time.

Further, in some systems, a receiver is required to support multiple data rates (e.g., baud rates), such as a full data rate (e.g., 50 Gbps) as well as a half (e.g., 25 Gbps) and/or a quarter data rate (e.g., 12.5 Gbps). Herein, the maximum data rate that the multi-rate receiver is capable of supporting is referred as the full rate, and a half rate refers to a data rate that is half of the full rate, etc. It is desirable that such a receiver can be implemented with minimal modifications from a receiver that only supports a single rate (or the full rate).

SUMMARY OF THE INVENTION

Accordingly, disclosed herein provide a mechanism to reduce or eliminate the interaction with respect to clock delay correction between adaptive equalization and timing recovery in a receiver configured to support multiple data rates, and yet preserve the capability of adaptation in the equalization process.

Embodiments of the present disclosure employ an equalizer that can effectively compensating the clock correction caused by equalization adaptation while operating as a T/M-spaced equalizer when the multi-rate receiver receive an analog signal having a data rate of 1/M of the full data rate, where M is an integer greater than 1. More specifically, the equalizer is coupled to the output of an analog-to-digital converter (ADC) and a decimator is coupled to the output of the equalizer. The output of the decimator is supplied to a slicer and a timing recovery module. The ADC and the equalizer both operate in their full operation rates irrespectively of the data rate of the received analog signal. Thus, for a received analog signal having 1/M of the full data rate and has the symbol period being T, the equalizer effectively operates in a T/M-spaced mode, and the decimator operates to decimate the signal by M if the received signal has a lower data rate than the full data rate of the receiver. However, if the received signal has the full data rate and has the symbol period being T, the equalizer effectively operates in a T-spaced mode and the decimator is disabled for by-passed.

In an equalization adaptation process, the adaptation logic coupled to the equalizer filter can dynamically adapt the equalizer coefficients to time-variant channel characteristics of a communication channel. The adaptation logic is further capable of detecting corrections in clock delay resultant from equalization adaptation, and accordingly compensating the corrections before sending an equalized signal to a phase detector and other downstream components in the timing recovery loop for clock recovery.

According to embodiments of the present disclosure, for an input analog signal having 1/M of the full data rate (e.g., half rate or quarter rate), a plurality of Center of Filter (COF) values (M COF values or more) are determined and used for clock delay correction resulting from the equalization adaptation. In some embodiments, each COF is derived from a function of a respective set of tap weights, where the function is defined depending on the configuration of the phase detector. Particularly, the adaptation logic includes a plurality of parallel COF units, each COF unit is configured to generate a COF value based on a respective function of a respective set of tap weights. Each COF is compared with a corresponding nominal COF (predetermined or dynamically adjusted) to obtain a COF offset. The plurality of resultant COF offsets are used as indications of clock phase correction caused by equalization adaptation, and selected tap weights are adjusted based on the offsets.

Because the equalizer operates in its full operation rate despite a lower data rate of the received analog signal, the equalizer (as well as the ADC) effectively oversamples the signal and produces an equalized signal having a sample period of T/M. Therefore, the taps selected for adjustment encompass at least M samples to correctly indicate the COF offset associate with one symbol.

During operation, the tap weights of the equalization filter vary with time in adaptation to variations in the communication channel characteristics. For a half rate signal, two current COFs can be generated in parallel as well as the associated COF offsets, the first COF derived from two first main taps ($w_{-1}$ and $w_1$) and the second COF derived from two second main taps ($w_{-2}$ and $w_2$). A set of selected tap weights (e.g., $w_{-1}$, $w_1$, $w_{-2}$ and $w_2$) are then adjusted based on the two COF offset by interpolating/extrapolating the same set of, another set of, selected tap weights (e.g., $w_0$, $w_{-1}$, $w_1$, $w_{-2}$ and $w_2$). The adjusted tap weights are fed back for adaptive equalization, which leads to reduced COF offsets. As a result, clock delay correction introduced by the adaptive equalization process is compensated, and its interaction with the timing recovery loop can be effectively and advantageously prevented.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings generally show similar orientations, this depiction in the Figures is arbitrary for the most part. Generally, the invention can be operated in any orientation.

BRIEF DESCRIPTION OF THE DRAWINGS

Embodiments of the present invention will be better understood from a reading of the following detailed description, taken in conjunction with the accompanying figures, in which like reference characters designate like elements.

MITIGATING INTERACTION BETWEEN ADAPTIVE EQUALIZATION AND TIMING RECOVERY IN MULTI-RATE RECEIVER

Embodiments of the present disclosure provide a multi-rate receiver including an equalizer disposed upstream of a decimator and capable of effectively preventing undesirable interaction between equalization adaptation and the overall timing recovery loop in cases of various data rates. The equalizer is disposed upstream of a decimator couple and operates in a full operation rate even in the case of a lower-than-full data rate, e.g., half or quarter data rate. For input analog signal having 1/M of the full data rate (M>1), a plurality of Center of Filter (COF) values (M COF values or more) are determine. Each COF may be derived from a function of a respective set of tap weights and compared with a corresponding nominal COF o obtain a COF offset. The plurality of resultant COF offsets are used as indications of clock phase correction caused by equalization adaptation to adjust a set of selected tap weights. Because the low rate signal is oversampled by the equalizer in combination with the upstream ADC, the equalized signal having a sample period of T/M. The taps selected for adjustment encompass at least M samples to correctly indicate the COF offset associate with one symbol.

Figure 1:
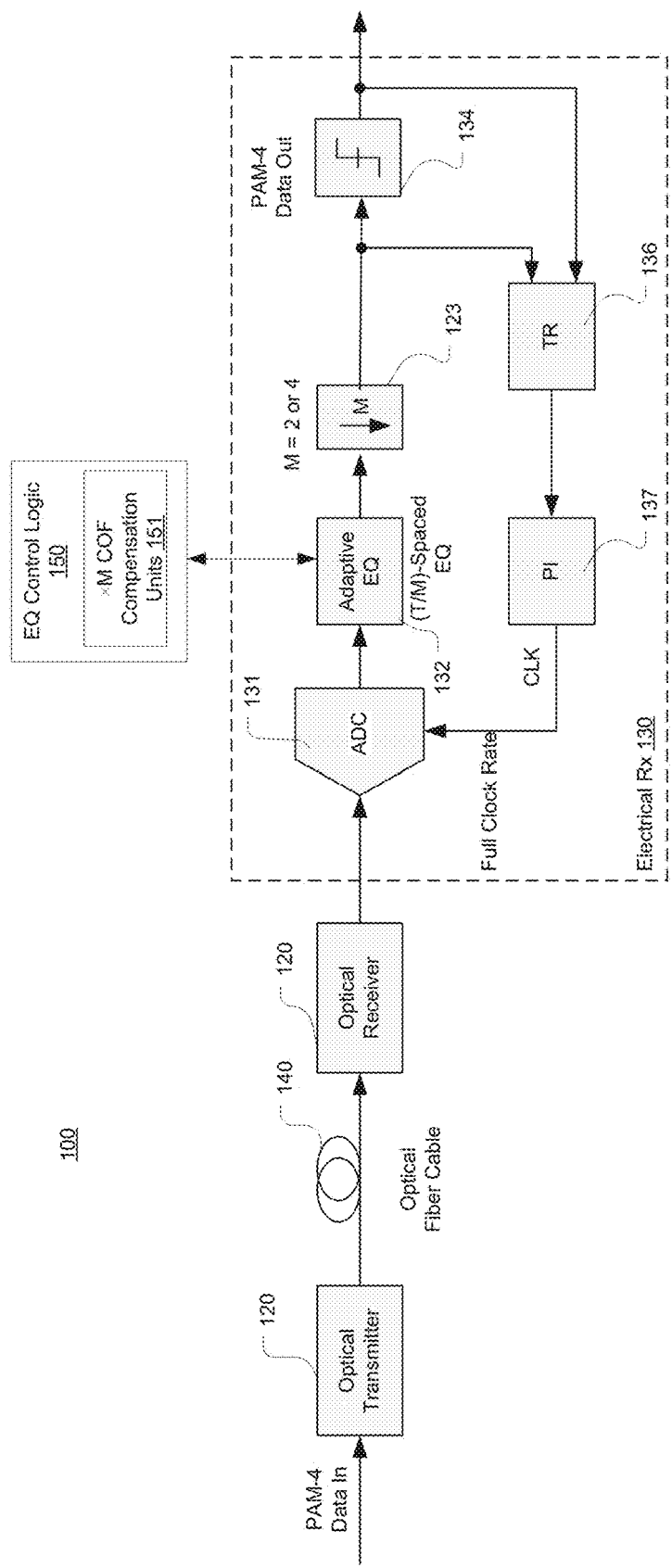
FIG. 1 illustrates a data communication system that includes an exemplary receiver with an equalizer disposed upstream of a decimator in accordance with an embodiment of the present disclosure.

FIG. 1 illustrates a data communication system 100 that includes an exemplary receiver with an equalizer disposed upstream of a decimator in accordance with an embodiment of the present disclosure. For example, the receiver 100 can be configured to supporting a full (maximum) data rate of 50 Gbps, a half data rate of 25 Gbps and a quarter data rate of 12.5 Gbps. However, it will be appreciated that the present disclosure is not limited to any specific data rates or any specific number of rates that a single receiver is configured for. Further a data rate referred herein may correspond to any suitable data rate unit, such as a bit-rate, a baud rate, a symbol rate, a sample rate etc.

In a simplified form, the system 100 includes an optical transmitter 110, an optical fiber cable 140, an optical receiver 120 and an electrical receiver 130. Data of different transmission rates can be propagate from the optical transmission 110 to the multi-rate electrical receiver 130. The optical transmitter 110 may include a driver and a Mach-Zehnder interferometer (MZI) and operate to receive data modulated according to PAM-4. The modulated data is sent for transportation through the optical fiber cable 140. The optical receiver 120 may include a photo detector and a transimpedance amplifier and operates to receive data from the optical fiber cable 140. The electrical receiver 130 receives the signals from the optical receiver 120 and performs data and clock recovery.

The electrical receiver 130 includes an analog-to-digital converter (ADC) 131, an adaptive equalizer (e.g., a feed-forward equalizer (FFE)) 132, a slicer 134, a timing recovery (TR) module 136 and a phase interpolator (PI) 137. The slicer 134 outputs the recovered and demodulated data based on appropriate constellation thresholds. Both the slicer input and the output are provided to the timing recovery module (TR) 136 for locating the correct sampling phase. The timing recovery module 136 may include a phase detector, a loop filter and a VCO (not shown). The timing recovery module 136 and the phase interpolator 137 in combination with the clock feedback path (CLK) to the ADC 131 form a timing recovery loop. To support a data rate that is only half and a quarter, or otherwise a fraction of, the maximum rate (the full rate), the electric receiver 130 includes a decimator 123 disposed downstream of the adaptive EQ 132.

Each component in the system 100 can be implemented in any suitable manner that is well known in the art without departing from the scope of the present disclosure. For example, the adaptive EQ 132 may be a decision-feedback equalizer (DFE) which also includes a feedback filter as the FFE.

More specifically, the adaptive EQ 132 is coupled to the output of the ADC 131 and the decimator 123 is coupled to the output of the adaptive EQ 132. The output of the decimator 123 is supplied to the slicer 134 as well as to the timing recovery module 236 and further to the phase interpolator 137. The ADC 131 operates in its full operation rate regardless of the data rate of the received signal. The decimator 123 operates to decimate the signal by M (M>1) if the received signal has a lower data rate than the full data rate. If the received signal has the full data rate, the decimator is disabled or by-passed.

For example, upon receiving a half rate signal with the symbol time period being T, the ADC 131 is clocked by a full rate clock and oversamples the analog data in the full sampling rate. The adaptive EQ 132 receives the digital input signal output from the ADC 131 and generates an equalized signal. The adaptive EQ 132 also operates in its full operation rate and samples the data in its full sample rate. For example, the EQ 132 operates in a fractionally-spaced equalizer. Therefore, the samples in the equalized signal are T/2-spaced (and T/4-spaced in the case of quarter rate). The equalizer output is then decimated by 2 (M=2) to produce a half rate signal with the sample period being T-spaced.

The decimated signal is then supplied to the slicer 134 to make slicer decisions on the symbols based on the proper modulation scheme, and also supplied to the timing recovery module 136 for sampling phase recovery and further to the phase interpolate 137 to output a recovered clock (CLK) having the full clock rate. The recovered clock is fed back to drive the ADC 131 that sample the input analog signal at the ADC's full operation rate. For example, the full data rate is 53.125 GHz, and correspondingly the recovered clock frequency is also 53.125 GHz.

Hence in a half-rate operation mode of the receiver, the ADC 131, the adaptive EQ 132 and the phase interpolator 137 all operate at their full operation rates, whereas the slicer and the timing recovery module both operate at their half operation rates. By the same token, in a quarter-rate operation mode of the receiver, the ADC 131, the adaptive EQ 132 and the phase interpolator 137 all operate at the full operation rates, whereas the slicer and the timing recovery module both operate at the quarter operation rates. On the other hand, if the received signal has a full data rate, all the components 131-137 operate in their full operation rates. It will be appreciated the various components 131-137 may have the same or the different full operation rates.

Because the equalizer disposed upstream of the decimator can effectively perform low pass filtering functions during an equalization process, there is no extra LPF needed to remove the high frequency noise before decimation, which advantageously simplifies the circuitry design and reduces the operational power consumption of the receiver. As a result, the latency associated with using an extra LPF is advantageously eliminated.

It will be appreciated that the electrical receiver 100 may include control logic that can select the proper operation modes for each component therein based on the detected data rate, including enabling or disabling the decimator and choosing the proper M for the decimator. The electrical receiver 100 may also include a wide range of other components that are well known in the art.

Equalization adaptation can be implemented by adapting the tap weights of the equalizer filter. The equalizer filter (e.g., an FIR filter) is an adaptive filter which enables it to track any changes over time of a transmission channel. During adaptation, the tap weights of the equalizer filter may be updated through a Least-Mean-Square (LMS) adaptation process with programmable step sizes for the taps. Especially, it's typical to have a different step size for the main three taps, namely the reference tap (RefTap) and the taps before and after the RefTap.

As noted above, equalization adaptation can cause undesirable clock delay correction when it is adaptive to the time-varying channel characteristics as it may interfere with timing recovery by the overall timing recovery loop. According to the present disclosure, the adaptive EQ 132 is coupled to EQ control logic 150 configured to control equalization adaptation to mitigate or prevent the interference in time delay correction.

The EQ control logic is configured to detect in real-time the amount of correction of time delay that results from the adaptation of equalization filter, and dynamically compensate the correction by modifying selected tap weights of the filter. Due to oversampling, the tap weights selected for adaptation in one cycle encompass multiple samples generated for one symbol.

Figure 5:
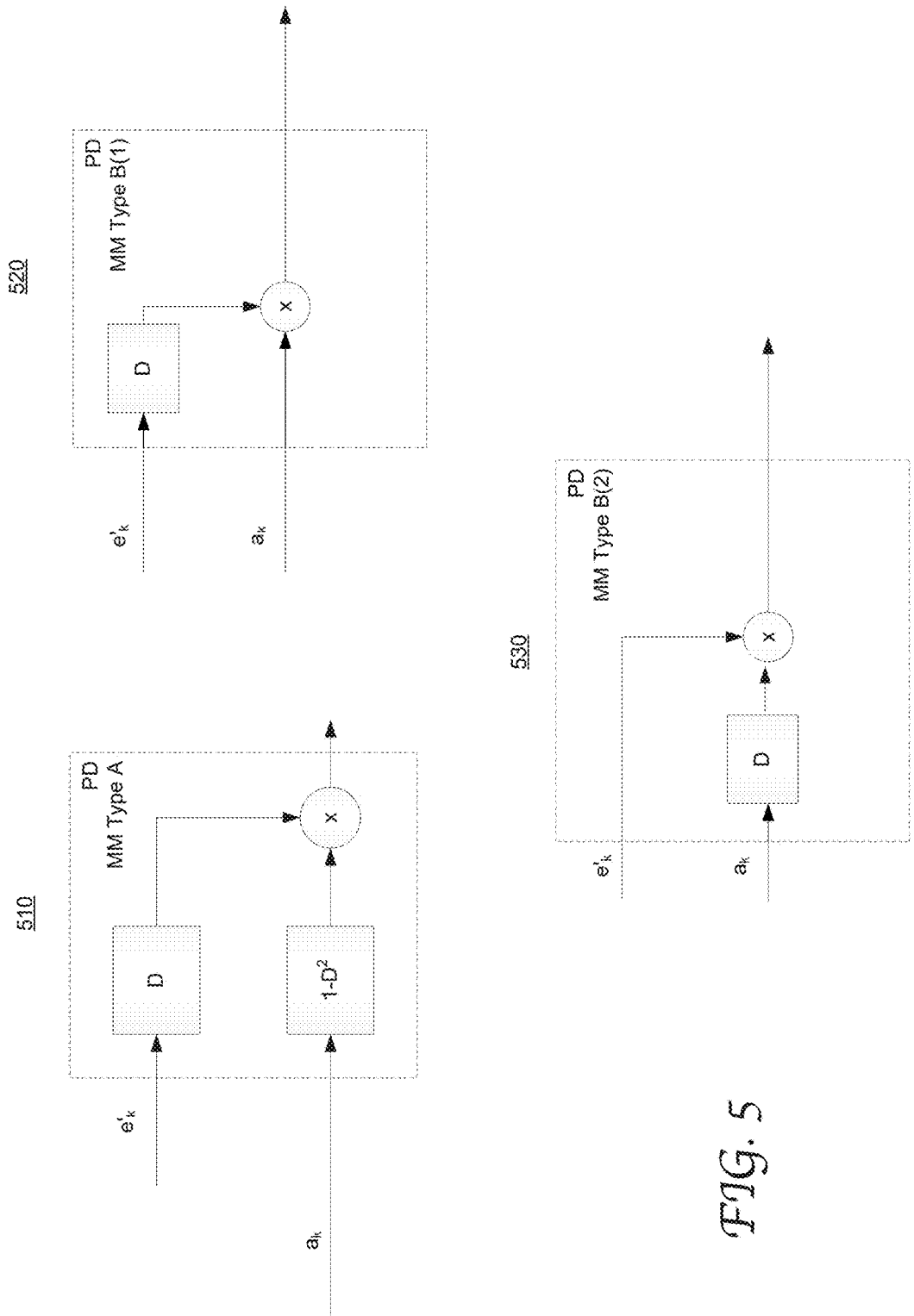
FIG. 5 illustrates the configurations of exemplary phase detectors that can be used in an equalizer-based timing recovery loop in accordance with an embodiment of the present disclosure.

A multitude of Center of Filters (COFs) are used as measures for clock delay correction introduced during adaptive equalization for a signal of a lower-than-full rate. In some embodiments, the definitions of Center of Filter (COF) are dependent on the type of the phase detector used in the timing recovery loop (as shown in FIG. 5). In the example described in detail herein, for a half rate signal for example, two COFs are defined which monitor and control adaptation of different sets of tap weights.

$$\text{COF\_1} = \begin{cases} w_1 - w_{-1} & PD \text{ Type } A \\ w_{-1} & PD \text{ Type } B \end{cases} \quad \text{(Equation 1)}$$

$$\text{COF\_2} = \begin{cases} w_2 - w_{-2} & PD \text{ Type } A \\ w_{-2} & PD \text{ Type } B \end{cases}$$

where $w_1$ is the weight of the tap after the RefTap and $w_{-1}$ is the weight of the tap before the RefTap; $w_2$ is the weight of the second tap after the RefTap and $w_{-2}$ is the weight of the second tap before the RefTap, the RefTap being the tap associated with the maximum tap weight. The multiple COFs can be calculated and saved into a register continuously following any change in the equalizer weights due to adaptation or COF compensation. It will be appreciated that the present disclosure is not limited to any specific definitions of COFs. Also, the definitions of COFs may vary with the particular configurations of the timing recovery loop and the components therein.

Figure 2:
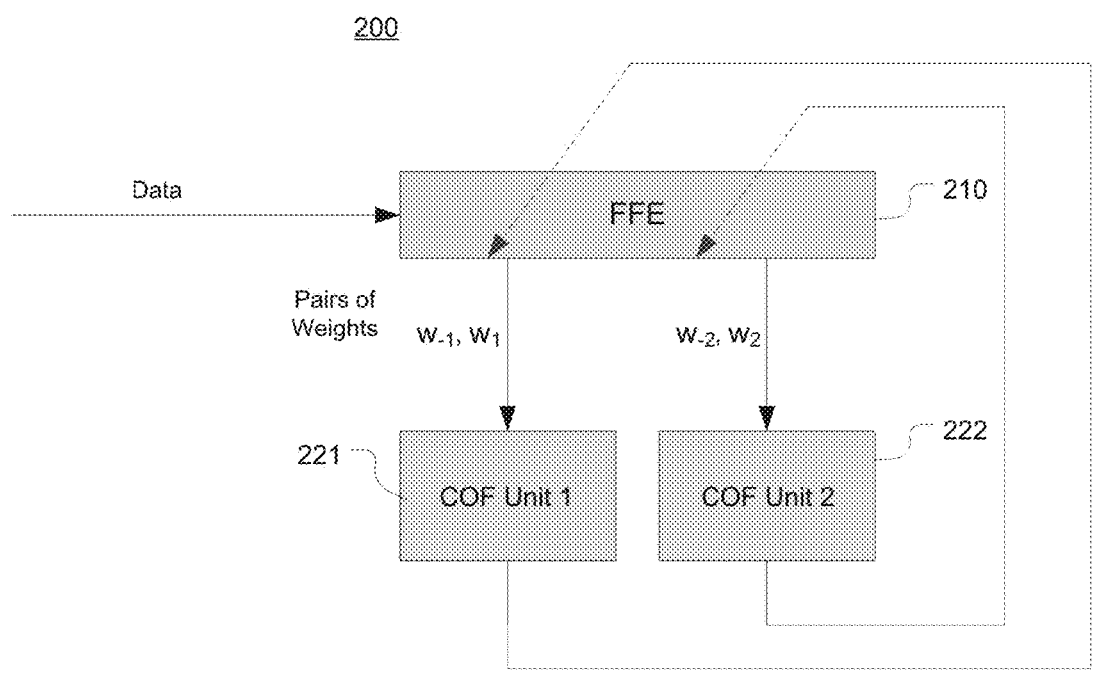
FIG. 2 illustrates the configuration an exemplary adaptive FFE controlled by two active COF units and operable to compensate clock correction caused by equalization adaptation during processing of a half rate signal in accordance with an embodiment of the present disclosure

The EQ control logic 150 includes at least M parallel COF units. For PD type A, each COF unit configured to control one pair of tap weights; and for PD type B, each COF unit is configured to control one tap weight as shown in Equation 1. FIG. 2 illustrates the configuration an exemplary adaptive FFE 200 controlled by two active COF units and operable to compensate clock correction caused by equalization adaptation during processing of a half rate signal in accordance with an embodiment of the present disclosure. The adaptive FFE 200 may include an array of parallel COF units which are selectively activated for processing signals of different data rates. For example, when the receiver receives a half rate analog signal, the two COF units 221 and 222 are activated to generate two COFs as defined in Equation 1. Two COF offsets are generated by comparing the COFs with the corresponding COF nominal values. For PD type A as an example, the COF offsets are then used to modify the two pairs of tap weights, respectively, namely $w_{-1}$, and $w_1$, $w_{-2}$ and $w_2$. For PD type B, the COF offsets are then used to modify the two tap weights, respectively, namely $w_{-1}$ and $w_{-2}$. However, it will be appreciated that additional COFs of lower taps may be optionally generated and used to update additional tap weights, e.g., $w_{-3}$ and $w_3$.

In response to a quarter rate analog signal, 4 COF units may be activated and each generates a pair of modified tap weights, $w_{-1}$, and $w_1$, . . . $w_{-4}$ and $w_{-4}$. In the examples described herein, the tap weights within each pair have symmetric locations with reference to the Ref tap. However, the present disclosure is not limited thereto.

Figure 3:
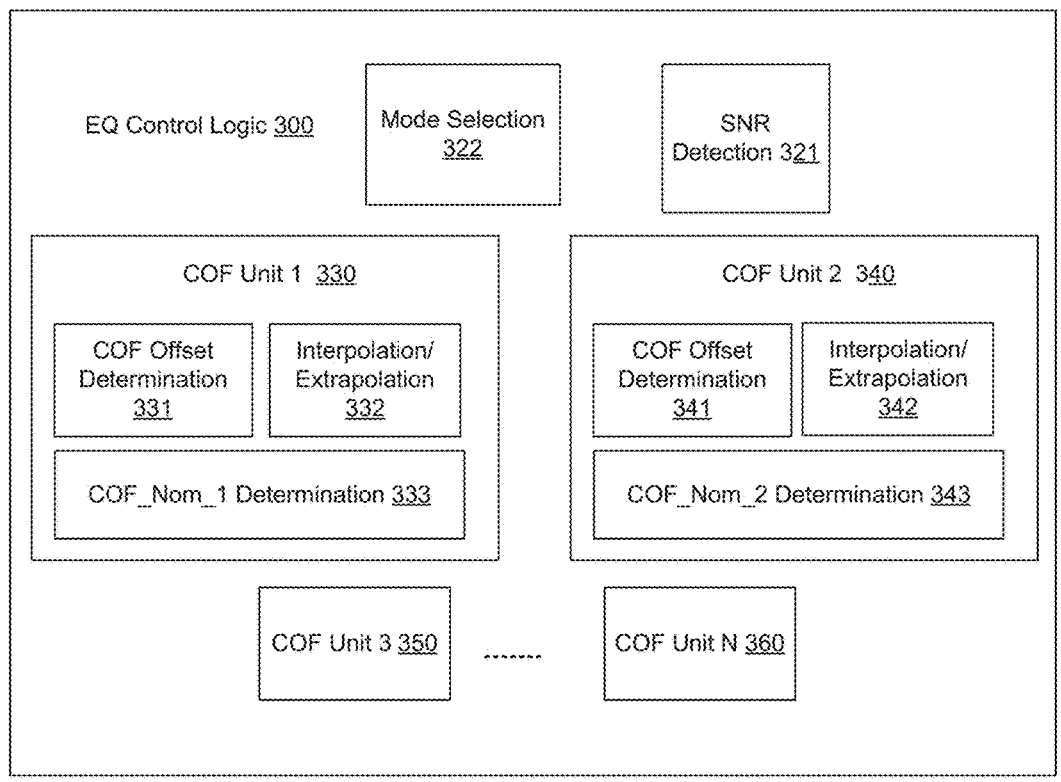
FIG. 3 illustrates the configuration of exemplary EQ control logic 300 operable to detect and compensate clock delay correction introduced by equalization adaptation by using parallel COF units according to an embodiment of the present disclosure

FIG. 3 illustrates the configuration of exemplary EQ control logic 300 operable to detect and compensate clock delay correction introduced by equalization adaptation by using parallel COF units 330, 340, 350, . . . , 360 according to an embodiment of the present disclosure. It will be appreciated that the present disclosure is not limited to any specific type of equalizer or any specific process or mechanism of adaptive equalization. The implementation of the equalizer is dependent on the adaptive process in the specific embodiment, such as an LMS adaptation process or any other method that is well-known in the art. In this example, the equalizer includes a filter having multiple taps, for instance, an FIR filter with 16 taps. Controlled by the EQ control logic, the tap weights of the equalizer filter are adapted through an LMS adaptation process.

According to embodiments of the present disclosure, the EQ control logic 300 includes an SNR detection module 321, a mode selection module 322 and COF units 1~N, e.g., 330 and 340. Each COF unit is configured to detect in real time, and accordingly compensate for, the clock phase correction caused by a respective set of taps during the adaptive equalization process. In the illustrated example, the COF units 1~N have the same configuration. Each COF unit is equipped with the COF offset determination logic (e.g., 331 or 341) for calculating COF offset based on the corresponding tap weights of the equalizer filter. A COF offset equals to or otherwise represents a difference between the current COF and a COF_nom value which can be determined by the COF_Nom determination logic (e.g., 333 or 343). Each COF offset serves to indicate the amount and direction (positive or negative) of clock delay correction contributed by a corresponding set of taps during the adaptive equalization process.

The interpolation/extrapolation logic (e.g., 332 or 342) in each COF unit interpolates and/or extrapolates a respective set of selected tap weights to adjust the same set of another set of selected tap weights based on the associated COF offset, as described in greater detail below. The EQ control logic 300 may be implemented using logic circuitry, a programmable microcontroller, a combination thereof, or any other suitable means. The EQ control logic 300 may includes any number of extra COF units of the similar configurations which can be selectively enabled depending on the data rate of a received analog signal.

The mode selection logic 322 can select an operation mode of the equalizer by selectively disabling or enabling its adaptation logic and the array of COF units. The operation mode can be selected based on the SNR as detected by the SNR detection logic 321 and the received signal data rate.

During operation, the adjusted tap weights are output from the EQ control logic 300, supplied back to the equalizer and used for equalization, leading to reduced COF offset. As a result, clock delay correction introduced by adaptive equalization can be compensated, and its interaction with the timing recovery loop can be effectively and advantageously prevented. Also, since the tap weights as adjusted based on the time delay correction that is dynamically calculated using COF offset as the metric, interference with the equalization adaptation caused by the tap weight adjustment is advantageously controlled to a minimal level. Further, an adequate number of taps that encompass the M samples for one symbol are adjusted to achieve a convergent result.

Figure 4:
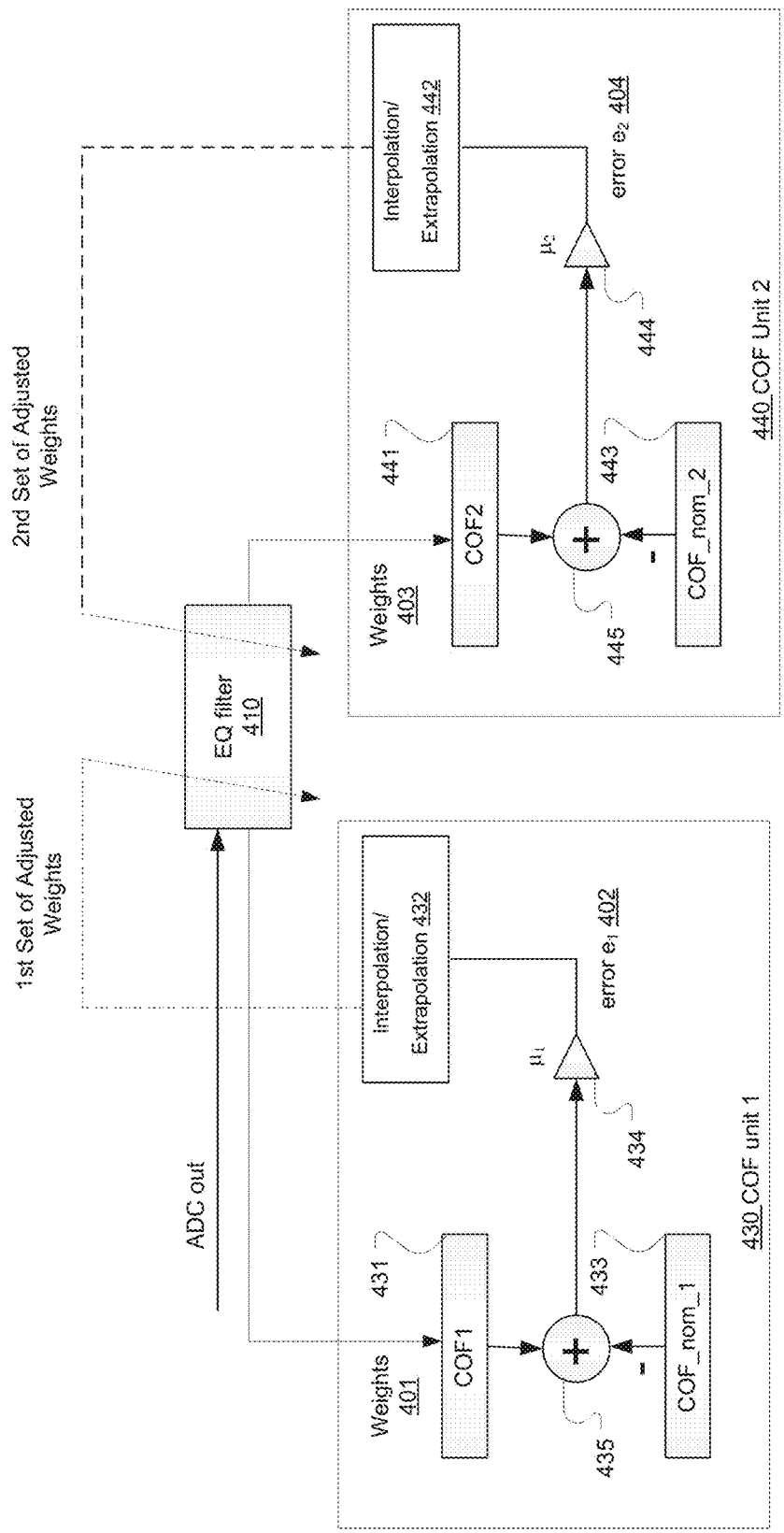
FIG. 4 illustrates the configuration of an adaptive equalizer comprising exemplary multiple parallel COF units coupled to the equalizer filter in accordance with an embodiment of the present disclosure.

FIG. 4 illustrates the configuration of an exemplary adaptive equalizer 400 comprising exemplary multiple COF units 430 and 440 coupled to the equalizer filter 410 in accordance with an embodiment of the present disclosure. The COF determination logic (COF1 431 and COF2 441) can receive the respective sets of tap weights of the equalizer filter 410 and calculate the current COF1 and COF2, for example as defined in Equation 1. The COFs are calculated and saved into a register continuously following any change of the tap weights due to adaptation and/or COF correction.

For example, the COF unit 1 430 includes a register 433 storing a nominal COF value (COF_nom), the COF determination logic 431 for computing the COF, an adder 435 for generating the COF offset, a multiplier 434 for multiplying the COF offset with a coefficient μ to generate the error 402, and the interpolation/extrapolation logic 432. The various components in COF unit 2 440 have the similar functions.

During operation, if COF1 is shifted relative to COF_nom_1, COF1 can be corrected by modifying a set of selected taps of the equalizer filter, e.g., $w_{-1}$ and $w_1$. Modification of the tap weights can be performed by interpolating/extrapolating the main three or five taps, or etc.

For example, if COF1 is shifted relative to COF_nom_1 due to LMS, COF1 is corrected by modifying the main two or one taps of the equalizer filter. The updated two main weights are corrected by the error (e.g., the error $e_1$ 402 in FIG. 4):

$$e_1 = \mu_1(COF1 - COF\_nom\_1), \qquad \text{(Equation 2)}$$

where the coefficient $\mu_1$ can depend on a programmable value n. For instance, $\mu_1$ can be defined as $$\mu_1 = \begin{cases} 2^{-n}, & n = 0:30 \\ 0, & n = 31 \end{cases} \quad \text{(Equation 3)}$$

where the default can be set as n=4; and, when n=31, the COF correction is disabled.

COF correction can be implemented in various suitable methods. In a first exemplary method, correction for each COF can be performed via linear interpolation based on a set of selected taps, e.g., 3 or 5 main taps. When 5 main taps are used, a linear interpolation is applied to get the 3 corrected main taps. When 3 main taps are used, an interpolation or extrapolation is used to get the corrected 3 main taps.

To simplify the implementation, the difference $\Delta COF = COF - COF\_nom$ can be approximated, so the implementation can use a shifter instead of a multiplier. For example, it can be approximated as:

$$\Delta COF \approx \text{sign}(\Delta COF) \cdot 2^{rnd(log2(abs(\Delta COF)))}$$

where "rnd" represent round, and abs represents absolute value. When $\Delta COF=0$, set e=0.

Corrections of the two main taps (before and after the RefTap) based on 3 tap weights can be given by:

for COF1:

$$y_1 = (w_1 - w_0) \cdot e_1 + w_1$$

$$y_{-1} = (w_0 - w_{-1}) \cdot e_1 + w_{-1}$$

for COF2:

$$y_2 = (w_2 - w_0) \cdot e_2 + w_2$$

$$y_{-2} = (w_0 - w_{-2}) \cdot e_2 + w_{-2}$$

where the old main weights are $w_{-2}, w_{-1}, w_0, w_1, w_2$ and the new weights are $y_{-2}, y_{-1}, y_0, y_1, y_2$. In this example, the weight of the RefTap is not corrected.

However, in an alternative embodiment, the RefTap can be corrected in combination with correction of the other two main taps as shown above. The RefTap correction can be represented as:

$$y_0 = (w_1 - w_0) \cdot e_1 + w_0, e_1 \geq 0$$

$$y_0 = (w_0 - w_{-1}) \cdot e_1 + w_0, e_1 < 0$$

In another exemplary method, the pair of weights is adjusted alternately in consecutive cycles. For example, for COF1:

$$y_1 = w_1 - e_1$$

$$y_{-1} = w_{-1} + e_1;$$

for COF2:

$$y_2 = w_2 - e_2$$

$$y_{-2} = w_{-2} + e_2;$$

The duration of the alternation can be set by a counter. For instance, the default value of the duration is set as 1, and the correction sequence is: $w_1, w_{-1}, w_1, w_{-1}, \ldots$, etc. A "STATE" register can be used and toggle between 0 and 1 after the counter reaches its end. When STATE=0, $w_{-1}$ is updated, and when STATE=1, $w_1$ is updated.

A programmable register "COF_TAP_CORRECTION" may be used, in combination with the STATE register, to control which taps are corrected based on COF offset. For instance, the values of the COF_TAP_CORRECTION can be defined as follows:

$$\text{COF\_TAP\_CORRECTION} = \begin{cases} 00, & \text{Corrects} & \text{none} \\ 01, & \text{Corrects} & w_1 \\ 10, & \text{Corrects} & w_{-1} \\ 11, & \text{Corrects} & w_{-1} \,\&\, w_1 \text{(default)} \end{cases}$$

Although embodiments of the present disclosure described herein use linear interpolation/extrapolation, various other suitable techniques, mechanisms, algorithms and methods that are well known in the art can be used to modify the tap weights for COF correction purposes. For example, exponential or parabola interpolation can be used instead. Further, the tap weights or other type of coefficients of an equalization filter can be updated for purposes of COF correction in any other suitable method or algorithm that is well known in the art.

The RefTap location refers to the tap index of the main tap that has the maximum absolute tap weight. When the tap weights are updated due to adaptation or COF correction, the RefTap may change to another location (a different tap index). In some embodiments, once the location of a RefTap is changed as a result of updating the tap weights (e.g., the main three taps), the updated tap weights are discarded and the previous values of these tap weights are loaded back.

FIG. 5 illustrates the configurations of exemplary phase detectors that can be used in an equalizer-based timing recovery loop in accordance with an embodiment of the present disclosure. A timing recovery loop may be equipped with or more types of phase detectors. Depending on the configuration of the phase detector that is enabled, a COF unit may select the corresponding COF calculation. Diagram 510 shows the configuration of a "type A" phase detector based on the Mueller Muller (MM) algorithm. The (original) Mueller-Muller (MM) phase detector type A is given by:

$$x_k a_{k-1} - x_{k-1} a_k$$

where, for equalizer-based timing recovery, $x_k$ is the slicer input at the $k^{th}$ sample and $a_k$ is the slicer decision at the $k^{th}$ sample.

In an alternative implementation of MM type A, $$e_{k-1} \cdot (a_k - a_{k-2})$$

which is equivalent to:

$$e_{k-1} a_k - e_{k-1} a_{k-2}$$

$$-(e_{k-1} a_{k-2} - e_{k-1} a_k)$$

Since the loop averages the phase detector output, the index of the first term can be shifted by +1, which gives:

$$-(e_k a_{k-1} - e_{k-1} a_k).$$

This is equivalent to the original MM type A equation.

Diagram 520 shows the configuration of a "type B(1)" phase detector based on the Mueller Muller algorithm. Diagram 330 shows the configuration of a "type B(2)" phase detector based on the Mueller Muller algorithm. The MM phase detector type B(1) can be given by:

$$x_k a_{k-1}$$

In another version of Mueller-Muller PD type B, the slicer error, $e_k$, replaces the slicer input, $x_k$, which gives:

$$-e_k a_{k-1}.$$

The timing recovery loop zeros the post-cursor $w_1$ when MM Type B phase detector is used.

In type B(2) phase detector, the slicer error, ea, replaces the slicer input, $-x_k$, giving:

$$-(e_k a_{k-1} - e_{k-1} a_k)$$

where the slicer error $e_k$ is given by $$e_k = a_k - x_k.$$

The two versions are equivalent because the mean of $a_k$ is zero.

In still another version of Mueller-Muller PD type B, the slicer error, $e_k$, replaces the slicer input, $x_k$, which gives $$e_{k-1} a_k.$$

Exemplary definitions of COF corresponding to these types of phase detectors are presented in Equation 1. Functions of these types of phase detectors are well known in the art and detailed description related thereto is omitted for brevity. It will be appreciated that any other suitable type of phase detector can also be used without departing the scope of the present disclosure. In such case, the definition of COF may change accordingly.

A variety of techniques, processes, methods and algorithms can be used to acquire a COF_nom (e.g., COF_nom_1 or COF_nom_2 in FIG. 4) without departing from the scope of the present disclosure. In one embodiment, a COF_nom can be user-assigned based on the expected channel characteristics. In some other embodiments, a COF_nom can be obtained through programmed tryouts using a number of candidate COF_nom values. The candidate value that yields an optimal performance can be selected as the COF_nom used for subsequent signal processing.

In still some other embodiments, the nominal COF of the equalizer is obtained after a successful timing recovery acquisition where the equalizer SNR is above a programmable threshold, or the equalizer noise is below a programmable threshold. The equalizer noise can be obtained via averaging of a squared slicer error for example.

In an acquisition state, the timing recovery loop runs for a programmable number of symbols. The programmable number is stored in a register and used to define the duration of the acquisition process. The mean squared error or the SNR of the equalizer signal, the mean squared error of the equalized signal and the COF values are saved, while the tap weights updating based on computed COF offset is disabled. At the end of the acquisition, a COF that corresponds to an optimal SNR may be selected as the COF_nom. In the tracking state, the tap weights are updated based on the computed COF offset.

A timing recovery loop according to the present disclosure can operate in various optional modes depending on whether COF compensation and equalization adaptation are enabled. In each mode, the timing recovery loop may operate in one of the two states: acquisition and tracking.

In the acquisition state, the timing recovery loop runs for a programmable number of symbols set by a register ("acquisition_duration" register). The mean squared error of the equalized signal and COF values are saved (updating is stopped) at the end of the acquisition state. Alternatively, the acquisition state is not controlled by the acquisition_duration register, but rather by the firmware. In the tracking state, the timing recovery process runs continuously.

In some embodiments, optimal tap weights and/or COF_noms may be obtained in an initial searching stage, and used as initial values for the subsequent equalization process.

Figure 6:
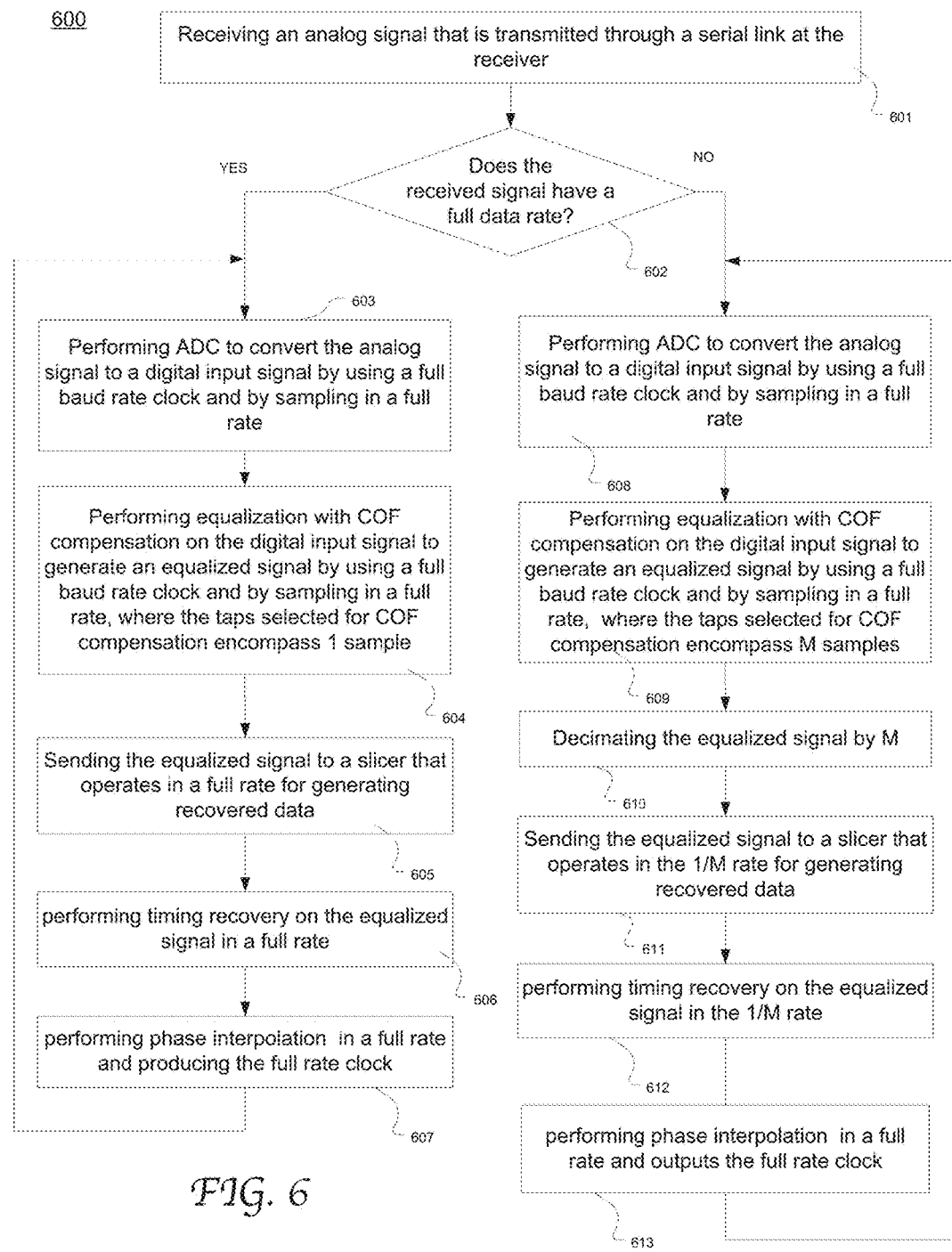
FIG. 6 is a flow chart depicting an exemplary process of data and clock recovery at a multi-rate receiver in accordance with an embodiment of the present disclosure.

FIG. 6 is a flow chart depicting an exemplary process 600 of data and clock recovery at a multi-rate receiver in accordance with an embodiment of the present disclosure. Process can be performed by the electrical receiver configured as 130 in FIG. 1 and the equalizer configured as shown in FIGS. 2-4 for example, but may also be performed by any other suitable hardware logic, software logic, firmware logic, or a combination thereof.

At 601, an input analog signal that is transmitted through a serial link is received at the receiver. At 602, it is determined whether the signal has the full data rate. If yes, at 603 analog-to-digital conversion is performed to convert the input analog signal into a digital input signal by using a full baud rate clock, including sampling the input signal in a full sampling rate. The full sampling rate may be the same as the clock rate in some embodiment, but may also be multiple times of the clock rate in some other embodiments, e.g., by using a multi-channel ADC.

At 604, an adaptive equalization process is performed to generate an equalized signal by using the full rate clock and by sampling the digital input signal in a full sampling rate. There may be only 1 COF circuit (e.g., COF unit 1 in FIG. 2 or FIG. 3) is enabled to compute a COF and COF offset to update a set of tap weights. In one compensation adjustment cycle (which includes computing the current COF and COF offset and generating updated tap weights as shown above), the tap weights selected for COF compensation encompass one sample, e.g., only the two first main taps ($w_{-1}$ and $w_1$) are adjusted. In some other embodiments, additional tap weights may be adjusted, e.g., the RefTap $w_0$.

At 605, the equalized signal is sent to a slicer that operates in a full rate and outputs recovered data. At 606, timing recovery is performed on the equalized signal in a full operation rate of a timing recovery module to produce the correct sampling phase. At 607, phase interpolation is performed in a full operation rate of the phase interpolator to produce the recovered clock which is supplied back for clocking the ADC. Thus, the foregoing loop 603-607 is repeated.

On the other hand, if the received analog signal has a data rate less than the full rate (as determined at 602), namely I/M rate, analog-to-digital conversion is still performed by using a full rate clock, including sampling the input signal in a full sampling rate. At 609, an adaptive equalization process is performed to generate an equalized signal by using the full rate clock and by sampling the digital input signal in a full sampling rate of the equalizer. The equalizer and the ADC may have the same full sampling rate. Because the low data rate signal is oversampled, the tap weights selected for COF compensation encompass M samples in one adjustment cycle, including computing the current COFs and COF offsets and generating updated tap weights as shown above.

At 610, the equalized signal is decimated or downsampled by M to generate a decimated signal.

At 611, the decimated signal is sent to a slicer that operates in 1/M of its full operation rate and outputs recovered data. At 612, timing recovery is performed on the decimated signal in 1/M of the full operation rate of the timing recovery module to produce the correct sampling phase. At 613, phase interpolation is performed in a full operation rate of the phase interpolator to produce the recovered clock which is supplied back for analog-to-digital conversion. Thus, the foregoing loop 608-613 is repeated.

Figure 7:
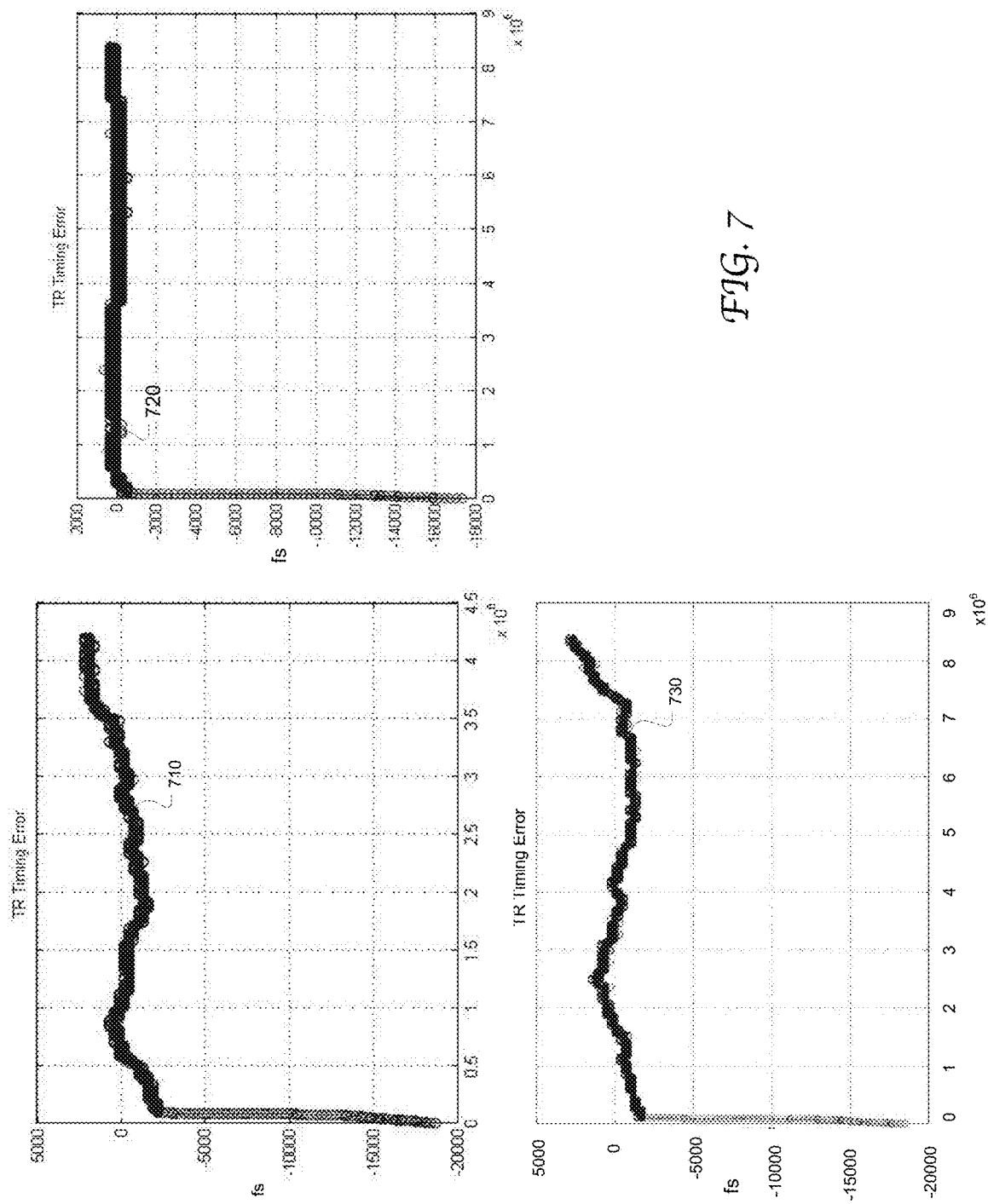
FIG. 7 shows data plots of simulation results that compare the timing recovery errors resulting from COF compensation by using different sets of COFs.

FIG. 7 shows data plots of simulation results that compare the timing recovery errors resulting from COF compensation by using different sets of COFs. The data plots 710-730 show timing recovery errors as a function of operating time during processing a half rate signal. Plot 720 is obtained by setting a large EQ adaptation step size of −3, and the COF compensation is disabled (n=31). As shown, with the COF compensation disabled, the EQ adaptation causes the timing recovery error to decrease at first but start to diverge after some time.

The data plot 720 is obtained by setting a large EQ adaptation step size of −3 and by enabling both COF1 and COF2, where COF1 is used to monitor and adjust $w_{-1}$ and $w_1$, and COF2 is used to monitor and adjust $w_{-2}$ and $w_2$. As shown, with both COF compensation units enabled, the EQ adaptation causes the timing recovery error to continue to decrease without divergence.

The data plot 730 is obtained by setting a large EQ adaptation step size of −3 and by enabling only COF1, wherein COF1 is sued to monitor and adjust $w_{-1}$ and $w_1$, and COF2 is disabled. As shown, with only 1 COF compensation unit enabled, the EQ adaptation causes the timing recovery error to decrease first and then start to diverge. Therefore, the data plot 720 shows far more superior result than data plot 730, which proves that COF compensation by also adjusting $w_{-2}$ and $w_2$ (by enabling COF2) can effectively prevent timing error divergence.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A device of processing signals transmitted via serial links, said device comprising:
 an analog-to-digital converter (ADC) configured to:
  receive a first analog signal having a first data rate;
  sample said first analog signal at a first rate; and
  generate a first digital input signal having a second data rate that is M times of said first data rate, wherein M is an integer greater than 2;
 an equalizer configured to generate a first equalized signal having said second data rate based on a plurality of equalizer parameters;
 a decimator coupled to an output of said equalizer and configured to: down-sample said first equalized signal to a decimated signal having said first data rate; and
 adaptation control logic coupled to said equalizer and configured to:
  determine a plurality of center of filters (COFs) of said equalizer in parallel, wherein each COF is determined based on a respective function of a respective set of equalizer parameters of said plurality of equalizer parameters, wherein said respective function of said respective set of equalizer parameters is associate with a respective COF nominal value;
  determine a plurality of offsets, wherein each offset indicates a difference between a COF and an associated COF nominal value;
  adjust said plurality of equalizer parameters based on said plurality of COF offsets.

2. The device of claim 1, wherein said respective COF nominal value is predetermined, and wherein further said adaptation control logic comprises M COF units arranged in parallel, wherein a respective COF unit is configured to:
 determine a respective COF and a respective COF offset;
 adjust a set of equalizer parameters of said plurality of equalizer parameters based on said COF offset.

3. The device of claim 2, wherein said respective COF unit comprises interpolation/extrapolation logic configured to adjust a first set of equalizer parameters based on said respective COF offset and further based on a second set of equalizer parameters of said plurality of equalizer parameters.

4. The device of claim 2, wherein said adaptation logic is further configured to:
 determine if adjusting said set of equalizer parameters causes a change in a reference tap location; and
 restore previous equalizer parameters for said set of equalizer parameters responsive to a determination of said change.

5. The device of claim 1, wherein said respective function of said respective set of equalizer parameter corresponds to a difference between two equalizer parameters that have symmetric locations relative to a reference equalizer parameter of said plurality of equalizer parameters.

6. The device of claim 1, wherein said respective function of said respective set of equalizer parameter corresponds to a value of a single equalizer parameter different than a reference equalizer parameter of said plurality of equalizer parameters.

7. The device of claim 1 further comprising:
 a slicer coupled to an output of said decimator; and
 a timing recovery module coupled to an output of said decimator and an output of said slicer, wherein said timing recovery module and said slicer are configured to operate at a 1/M of respective full operation rates responsive to said first analog signal.

8. The device of claim 7,
 wherein said ADC is further configured to:
  receive a second analog signal transmitted in said second data rate;
  sample said second analog signal in said first rate; and
  generate a second digital input signal,
 wherein said equalizer is further configured to generate a second equalized signal having said second data rate, and
 wherein said decimator is further configured to be deactivated responsive to said second analog signal.

9. The device of claim 8, wherein said slicer and said timing recovery module are further configured to operate at said respective full operation rates thereof responsive to said second analog signal.

10. The device of claim 7 further comprising a phase interpolator coupled to an output of said timing recovery module and is configured to operate in a full operation rate and generate said clock signal in said first rate both responsive to said second analog signal and responsive to said first analog signal.

11. A method of processing received signals of different data rates, said method comprising:
 receiving a first analog signal having a first data rate;
 converting said first analog signal to a first digital input signal by using a clock signal having a first rate during analog-to-digital conversion;
 performing equalization on said first digital input signal to generate a first equalized signal by using a plurality of equalizer parameters, wherein said performing equalization comprises:
  determining a plurality of center of filters (COFs) of an equalizer in parallel, wherein each COF is determined based on a respective function of a respective set of equalizer parameters of said plurality of equalizer parameters, wherein said respective function of said respective set of equalizer parameters is associate with a respective COF nominal value;

determining a plurality of offsets, wherein each offset indicates a difference between a COF and an associated COF nominal value;

adjusting said plurality of equalizer parameters based on said plurality of COF offsets;

decimating said first equalized signal by M to generate a decimated signal, wherein M is an integer greater than 1; and performing timing recovery on said decimated signal to obtain said clock signal having said first rate.

12. The method of claim 11, wherein said plurality of COFs comprises M or more COFs, and wherein said adjusting comprises updating M sets of equalizer parameters of said plurality of equalizer parameters based on M COF offsets, respectively.

13. The method of claim 12, wherein said updating comprises updating a first set of equalizer parameters of said M set by interpolating or extrapolating selected equalizer parameters of said plurality of equalizer parameters based on a corresponding COF offset.

14. The method of claim 11, wherein said respective function of said respective set of equalizer parameter corresponds to a difference between two equalizer parameters that have symmetric locations relative to a reference equalizer parameter of said plurality of equalizer parameters.

15. The method of claim 11, wherein said respective function of said respective set of equalizer parameter corresponds to a value of a single equalizer parameter different than a reference equalizer parameter of said plurality of equalizer parameters.

16. The method of claim 11, wherein said timing recovery is performed in 1/M of a full operation rate of a timing recovery module responsive to said first analog signal, and wherein further said equalization is performed in a full operation rate of an equalizer responsive to said first analog signal.

17. The method of claim 16 further comprising:
receiving a second analog signal that is transmitted in a second data rate that is M times of said first data rate;
converting said second analog signal to a second digital input signal by using said clock signal having said first rate during analog-to-digital conversion;
performing equalization in said first full operation rate of said equalizer on said second digital input signal to generate a second equalized signal by using a single COF offset; and
performing timing recovery on said second equalized signal without decimating to obtain said clock signal having said first rate.

18. A receiver comprising:
an analog-to-digital converter (ADC) configured to:
convert a first analog signal having a first data rate to a first digital input signal by using a first rate for sampling; and
convert a second analog signal having a second data rate to a second digital input signal by using said first rate for sampling, wherein said second data rate is M times of said first data rate, wherein M is an integer greater than 1;

an equalizer coupled to an output of said ADC and configured to using a plurality of equalizer parameters to:
perform equalization on said first digital input signal to generate a first equalized signal by using a full operation rate of said equalizer; and
perform equalization on said second digital input signal to generate a second equalized signal by using said full operation rate of said equalizer;
a decimator coupled to an output of said equalizer; and
a timing recovery module coupled to an output of said decimator,
wherein said equalizer is further configured to, responsive to said first analog signal:
determine a plurality of center of filters (COFs) in parallel, wherein each COF is determined based on a respective function of a respective set of equalizer parameters of said plurality of equalizer parameters, wherein said respective function of said respective set of equalizer parameters is associate with a respective COF nominal value;
determine a plurality of COF offsets, wherein each offset indicates a difference between a COF and an associated COF nominal value;
adjust said plurality of equalizer parameters based on said plurality of COF offsets.

19. The receiver of claim 18, wherein said decimator is configured to: decimate said first equalized signal by M; and send a decimated signal to said timing recovery module, and wherein further said decimator is configured to be deactivated responsive to said second equalized signal.

20. The receiver of claim 18, wherein said equalizer is further configured to, responsive to said second analog signal,
determine a single COF of said equalizer,
determine a single COF offset between said single COF and a COF nominal value;
adjusting said plurality of equalizer parameters based on said single COF offset.

21. The receiver of claim 18 further comprising:
a slicer coupled to an output of said decimator and configured to:
operate in a 1/M of a full operation rate of said slicer responsive to said first analog signal; and
operate in said full operation rate of said slicer responsive to said second analog signal; and
a phase interpolator coupled between said timing recovery module and said ADC, wherein said phase interpolator is configured to generate a clock signal for supply to said ADC in a same rate responsive to said first analog signal and to said second analog signal.

22. The receiver of claim 18, wherein said timing recovery module is configured to:
perform timing recovery in a 1/M of a full operation rate of said timing recovery module responsive to said first analog signal; and
perform timing recovery in said full operation rate of said timing recovery module responsive to said second analog signal.

* * * * *